Sept. 14, 1954  H. A. CORBETT  2,688,790
FISHHOOK MAKING MACHINE
Filed Oct. 20, 1949  7 Sheets-Sheet 1

Inventor
Herbert A. Corbett
By his Attorney

Inventor
Herbert A. Corbett
By his Attorney

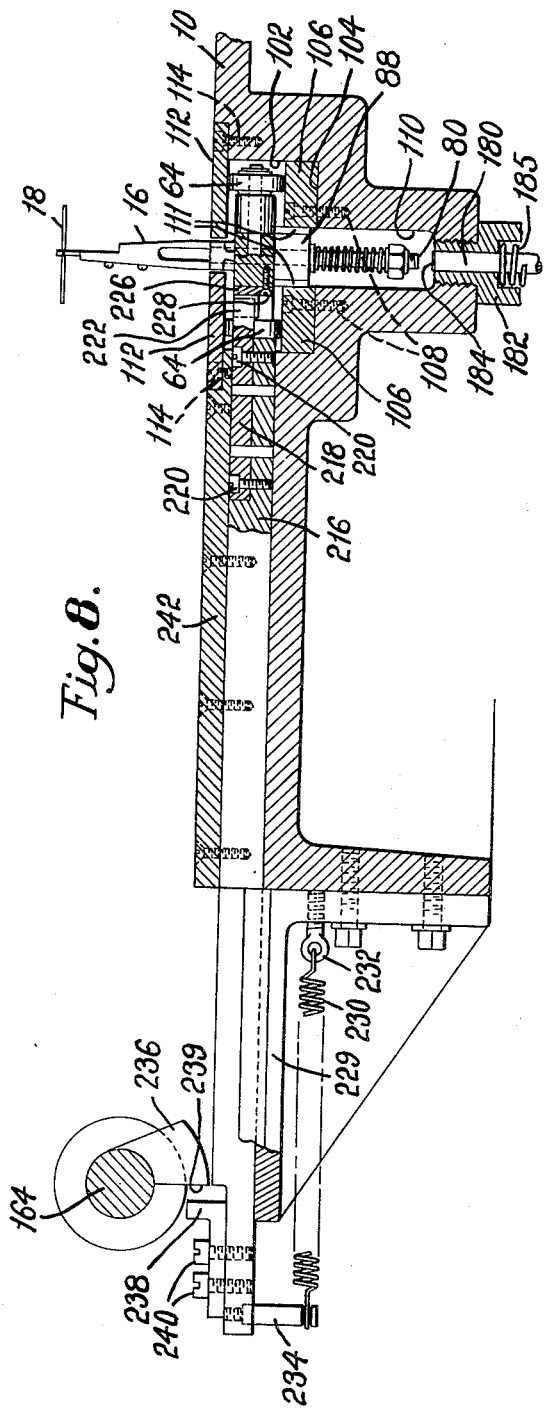
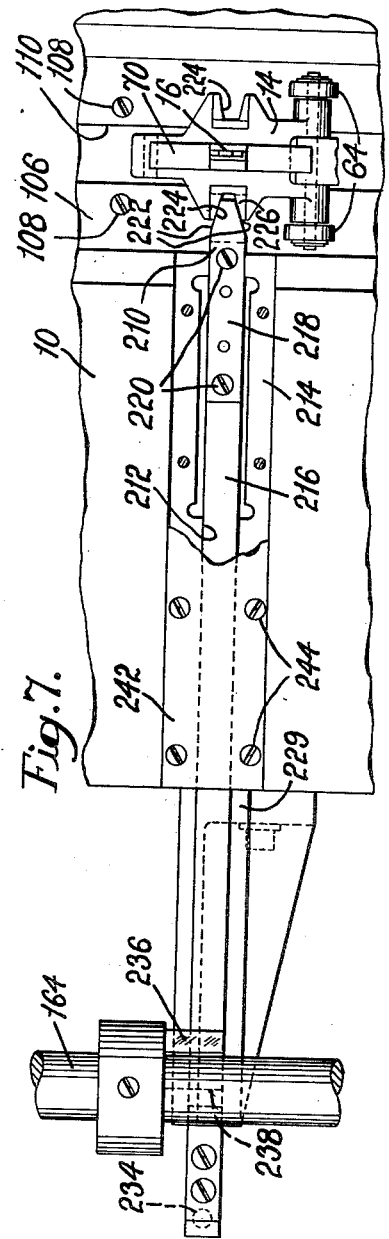

Sept. 14, 1954  H. A. CORBETT  2,688,790
FISHHOOK MAKING MACHINE
Filed Oct. 20, 1949  7 Sheets-Sheet 7
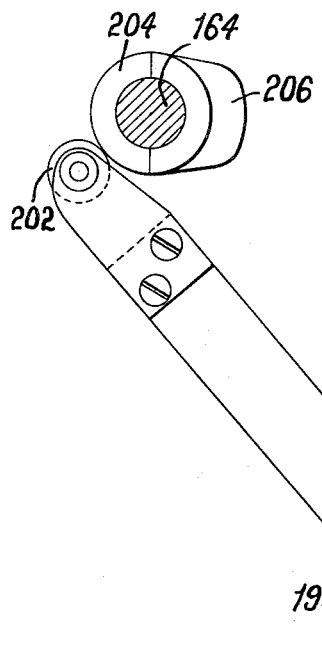
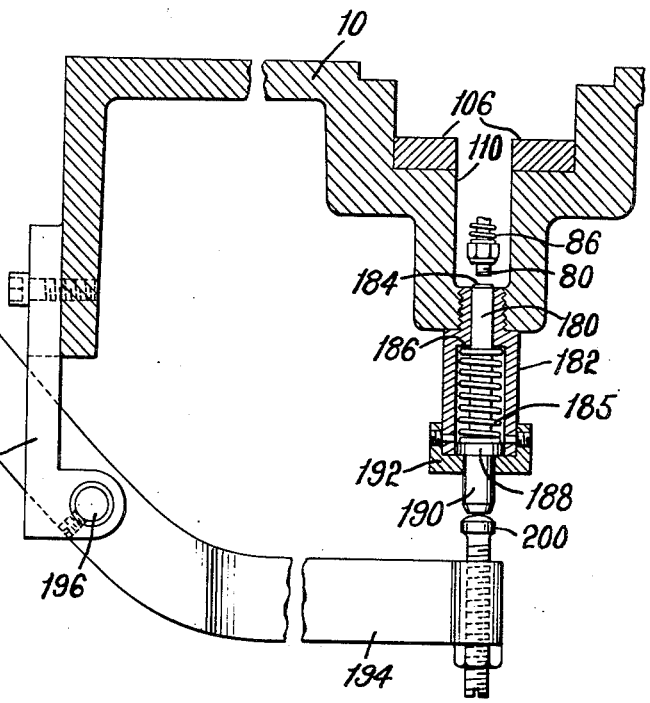
Fig. 10.
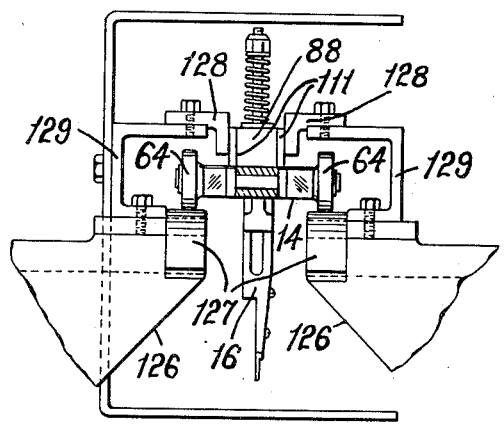
Fig. 9.
Inventor
Herbert A. Corbett
By his Attorney Patented Sept. 14, 1954

2,688,790

UNITED STATES PATENT OFFICE 2,688,790

FISHHOOK MAKING MACHINE

Herbert A. Corbett, Auburn, N. Y., assignor, by mesne assignments, to Auburn Fishhook Company, Inc., Auburn, N. Y., a corporation of New York Application October 20, 1949, Serial No. 122,527

3 Claims. (Cl. 29—9)

This invention relates to fishhook making machines, and is herein illustrated as embodied in an automatic machine for producing completely formed fishhooks from wire.

In making fishhooks by the use of automatic machines it has been found generally that the highest rate of production is obtained when the machines employed are of the type in which there are several operating stations acting simultaneously upon different blanks, each station performing one of the necessary operations to produce finished hooks of the desired configuration, and the blanks being intermittently advanced successively from one station to another. Thus, after the first blank has reached the last station, each single cycle of operation of the machine results in the production of a finished hook.

Such automatic machines, commonly, are either of the dial press type in which a dial, or turret, advances a blank from one station to another, or are of the linear type, in which the blank is advanced from one station to another by a succession of separately operable feed devices.

In the first type mentioned, the size of the dial, or turret, is a limitation on the number of stations which can be employed since all of the operating mechanisms of the stations must be located around or within the relatively small periphery of the dial. This is likely to be a handicap, since any increase in the diameter of the dial results in a large increase in the mass of the moving parts, and a consequent increase in wear of parts and in difficulties in indexing the dial. The limitation as to number of stations thus reduces the number of different styles of fishhooks that a particular dial machine can produce.

In machines of the linear type blanks are advanced step by step transversely of or along a general line of feed, from station to station. The repeated transfer of blanks from one station to another has made it difficult accurately to control the blanks during their movements and has necessitated the use of complicated feeding and locating mechanisms. As far as is known, no fully automatic machine of this type for performing all of the required operations to produce fishhooks has been devised.

In view of the foregoing, it is an object of the present invention to provide an improved automatic multistation fishhook making machine which will be particularly adapted to use in making fishhooks of widely varying styles while at the same time will have comparatively simple and adequate means for accurately controlling the positioning of the blanks at the operating stations and their movement from one station to another.

To this end and in accordance with one feature of the invention, there is provided in a fishhook making machine, an endless conveyor mounted for intermittent movement along a table and a plurality of operating instrumentalities mounted on the table along the path of movement of the conveyor, the conveyor being made up of separate units each comprising a link having means for interlocking with adjacent links, and a blank supporting chuck, together with registration devices on the table cooperable with portions of the links for locating the chucks in predetermined positions relatively to the operating instrumentalities after each movement of the conveyor.

This registration mechanism contributes greatly to the accuracy of the machine by taking up any play between the parts and avoids crippled blanks by insuring that blanks are accurately presented at the various operating points.

Preferably, and as shown, the links are of the same shape and size so that their manufacture is facilitated. Furthermore, by arranging the instrumentalities along the conveyor spaced apart by distances corresponding to multiples of the length of a link, the chucks will present blanks positioned therein successively to the various instrumentalities in proper position for operation, and instrumentalities may be removed or new ones readily added without adjustment of the conveyor. This contributes to a saving in time required for setting up the machine for a particular run.

These and other features of the invention are disclosed in the following specification and in the accompanying drawings, and are pointed out in the claims.

In the drawings,

Fig. 7 is a plan view of a portion of the machine including the registering mechanism;

Fig. 8 is a view in side elevation, and partly in section, of the portion of the machine shown in Fig. 7;

Fig. 9 is a cross sectional view taken along lines IX—IX of Fig. 4; and

Fig. 10 is a view in side elevation, and partly in section, of chuck operating mechanism.

Figure 1:
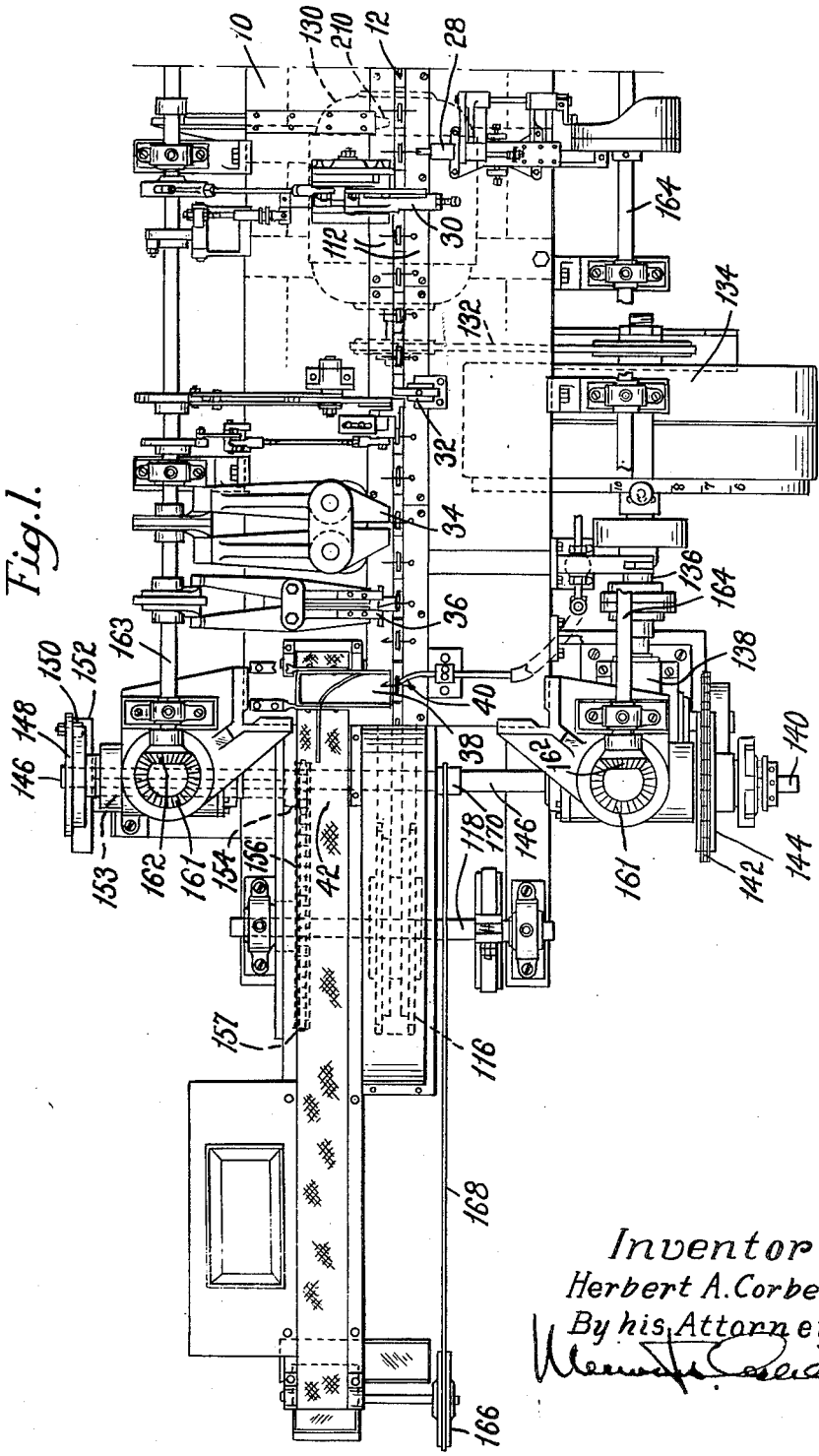
Fig. 1 is a plan view of the left hand portion of an automatic fishhook making machine illustrating one embodiment of the invention.

The illustrated machine is a fully automatic machine for performing all the necessary operations upon wire to produce completely formed fishhooks. It comprises a table or base 10, Figs. 1 to 4, along which is intermittently advanced an endless conveyor 12 made of a number of link units 14 each having chuck 16 for supporting a fishhook blank 18, the chucks being advanced successively to present blanks to various operating instrumentalities located on the table along the path of movement of the conveyor.

Figure 2:
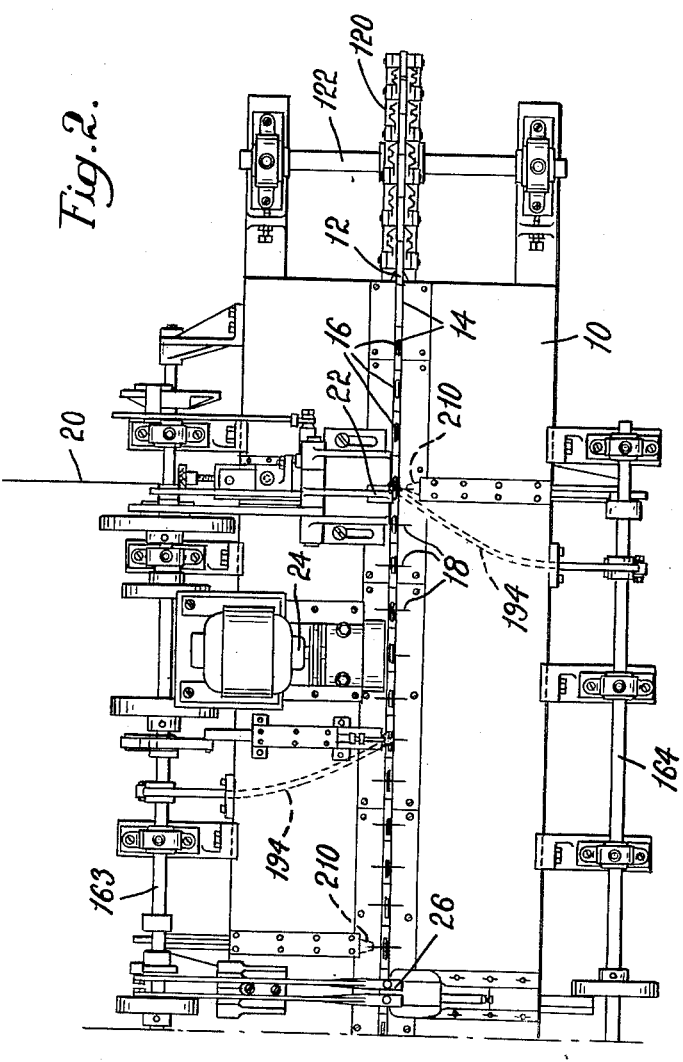
Fig. 2 is a plan view of the right hand portion of the machine.
Figure 3:
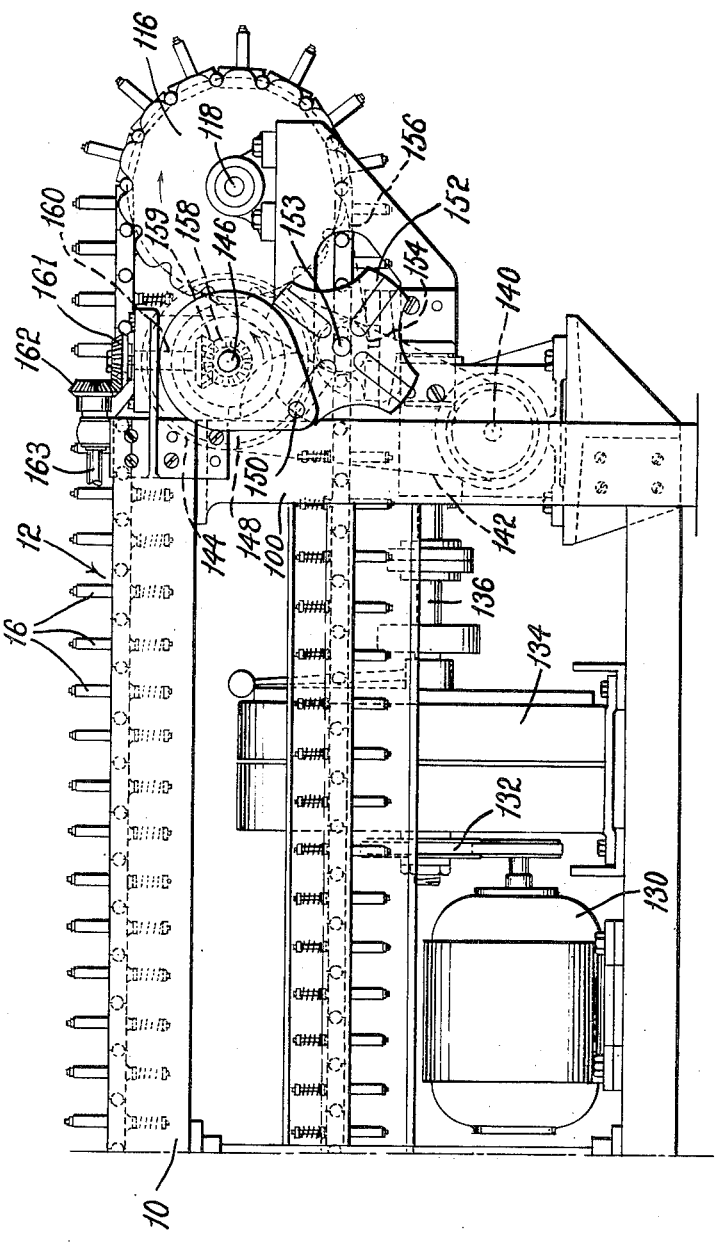
Fig. 3 is a rear elevation of the portion of the machine shown in Fig. 1.
Figure 4:
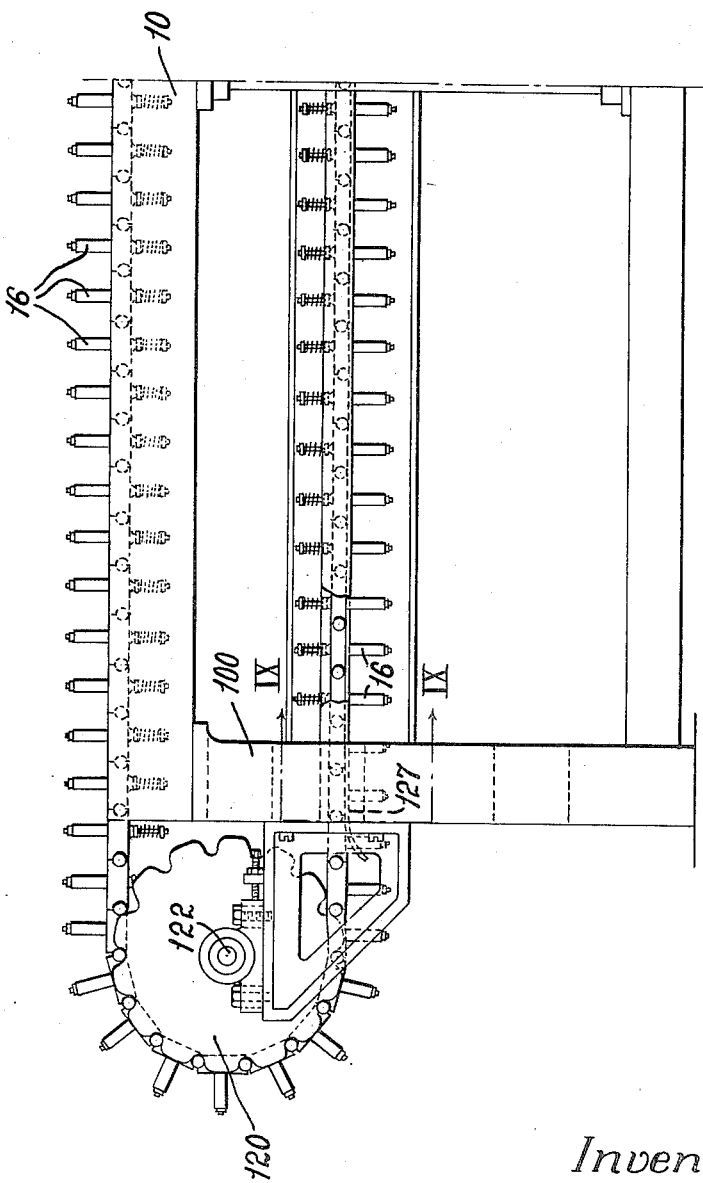
Fig. 4 is a rear elevation of the portion of the machine shown in Fig. 2.

Figs. 1 and 2 illustrate the general plan of operation of the machine and show one arrangement of operating instrumentalities. As shown, wire 20, Fig. 2, is led to a cut-off station 22 where blanks 18 are successively severed, each blank being received by a chuck 16 which advances it to a point swaging mechanism 24, and thence to eyeing mechanism 26. After the eye is formed the blank is rotated 45° at a transfer station 28, Fig. 1, and then successively passes to a barbing mechanism 30, hook forming mechanism 32, forging jaws 34, and kirbing mechanism 36. The formed hook is then advanced to a discharge station 38 at which the hook is blown by an air nozzle 40 onto a delivery belt 42.

The various operating instrumentalities are not disclosed in detail herein, but reference may be had to copending application Serial No. 657,794 filed March 28, 1946, now Patent No. 2,668,590 issued February 9, 1954, in the names of DeWitt and Corbett for disclosure of blank cut-off and point swaging mechanisms; to United States Letters Patent No. 2,451,477, granted October 19, 1948, upon application filed in the names of De Witt and Corbett for disclosures of eyeing and transfer mechanisms; and to United States Letters Patent No. 2,379,886, granted July 10, 1945, upon application filed in the names of De Witt, Ott and Runk for disclosures of barbing, hook forming, forging and kirbing mechanisms.

Figure 5:
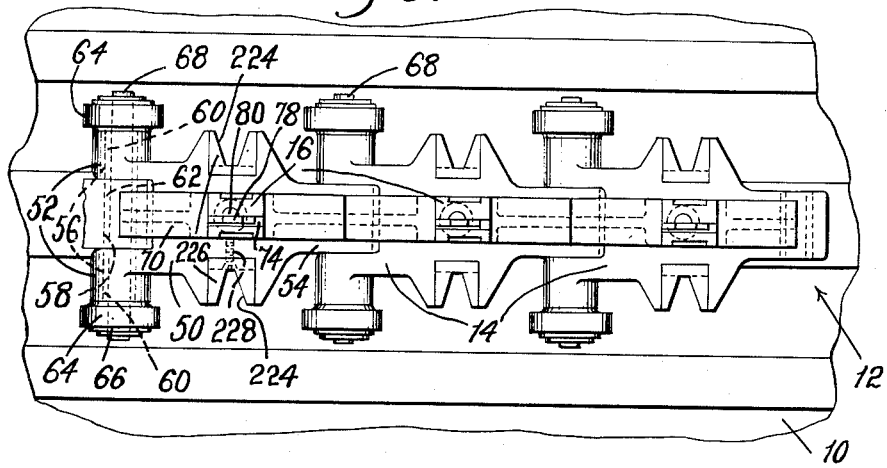
Fig. 5 is a plan view of a portion of the conveyor.
Figure 6:
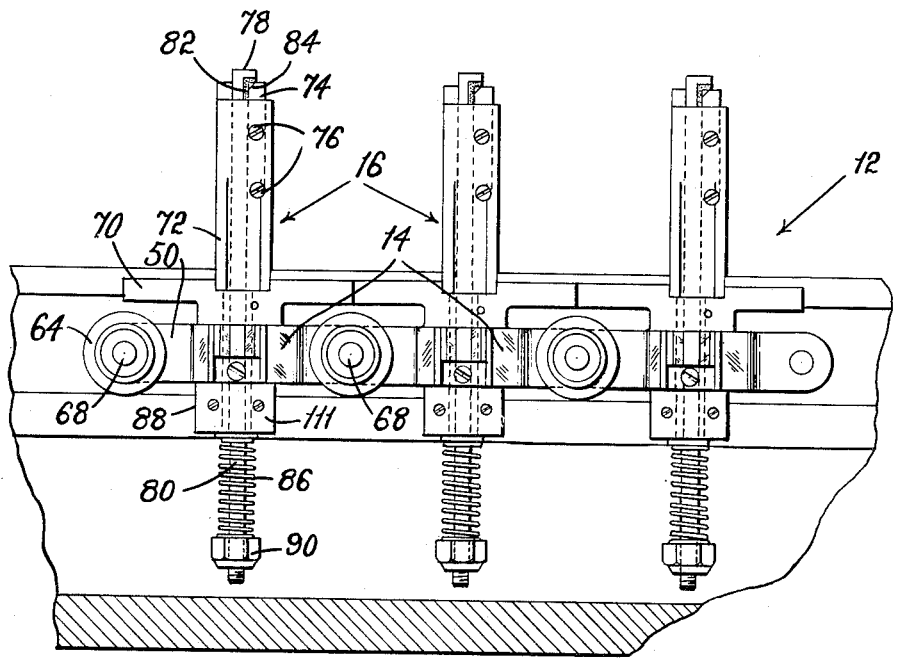
Fig. 6 is a side elevation of the portion of the conveyor shown in Fig. 5.

As shown in Figs. 5 and 6, each of the conveyor units 14 comprises a link portion 50 terminating in bifurcated portions 52 at one end and in a single projection 54 at the other end. Each projection 54 is shaped so that it can be received within the bifurcated portion 52 of an adjacent link. The parts 52 and 54 are bored at 56 and 58 to receive hardened bushings 60 and 62 respectively. The outer ends of the bushings carry rollers 64 retained on the bushings by collars 66.

Adjacent links of the conveyor are connected together by pins 68 which pass through bushings 60 and 62 thus forming pivotal connections.

Extending upwardly from each link 50 is a platform 70 upon which is supported the body portion 72 of a chuck 16. Within the chuck body is a fixed chuck jaw 74 secured in position therein by screws 76.

Cooperating with the fixed jaw 74 is a movable chuck jaw 78 projecting laterally from the upper end of a plunger 80 slidably mounted in the chuck body. The jaw is provided with a liner 82 of wear resistant material for engaging a blank to grip it between the two jaws. The fixed jaw is beveled at its inner end as shown at 84 to provide a groove to assist in retaining a blank in position. The movable jaw is normally urged downwardly toward the fixed jaw by a spring 86 bearing against a downwardly projecting boss 88 on the link and against a nut 90 on the lower end of the plunger 80. Adjustment of the gripping pressure of the jaws is obtained by varying the position of the nut along the plunger.

The table 10 is a casting supported on a frame 100 (Figs. 3 and 4), and has in its central portion a longitudinally extending recess 102 (Fig. 8) for receiving the conveyor. The walls of the recess have shoulders 104 upon which are located rails 106 secured in position by bolts 108. The rails serve to support that portion of the conveyor moving along the table, the rollers 64 on the links resting directly upon the rails. A groove 110 is provided in the table as clearance for the plunger 80 and its associated parts.

The conveyor is guided along the table or base 10 by means of the bosses 88 which extend downwardly between the rails and have wear plates 111 in engagement with side portions of the rails.

Cover plates 112 extending upon opposite sides of the chucks 16 and secured to the table by screws 114 close the greater part of the recess to prevent ingress of foreign material which might clog the rollers. The platforms 70 of each link 50 extend in opposite directions substantially to vertical planes through the pins 68 so that the platforms of adjacent links are close together preventing foreign material from entering between the links.

The conveyor extends over a driving drum 116 mounted on a shaft 118 at one end of the machine and over an idler drum 120 mounted on a shaft 122 at the other end of the machine. Each of the drums is provided with recesses 124 for engaging the rollers 64 of the link units 14. The conveyor passes over the drum 116, along the table or base 10, over the drum 120, and back to the drum 116. The lower run of the conveyor is supported by brackets 126, Fig. 9, the rollers 64 of the link units 14 resting upon rails 127 carried by the brackets, the link units being guided by rails 128 engaging opposite sides of the bosses 88, and mounted on extensions 129 of the brackets.

The machine is driven by an electric motor 130 (Figs. 1 and 3), which, through a belt 132, drives a variable speed control unit 134 having an output shaft 136 operatively connected to a gear reduction unit 138. The output shaft 140 of this unit drives a chain 142 passing over a sprocket 144 carried by a shaft 146. The shaft 146 carries a wheel 148 having a pin 150 arranged to engage and intermittently to rotate a Geneva 152 on a shaft 153. The shaft 153 carries a sprocket 154 which, through a chain 156 and sprocket 157, is operative to drive the shaft 118 carrying the drum 116.

The shaft 146 has gears 158 in mesh with pinions 159 on stub shafts 160 having at their upper ends pinions 161 engaging pinions 162 on cam shafts 163 and 164 which extend horizontally along opposite sides of the table, and provide power for the various operating instrumentalities.

The delivery belt 42 is driven by a pulley 166 and belt 168 passing over a pulley 170 on the shaft 146.

Mechanism is provided for actuating the movable jaws of the chucks 16 at various points along the path of movement of the conveyor such as, for example, at the cut-off station 22 where the blanks are first presented to the chucks. Similar mechanisms may be employed at the transfer station 28, at the discharge station 38, and elsewhere if desired.

The mechanism at the cut-off station comprises a pin 180 slidably mounted in a sleeve 182, positioned in the table 10 at the bottom of the groove 110, and having an end face 184 for engaging the lower end of the plunger 80 to raise the movable jaw 78, Fig. 6, of a chuck against the pressure of the spring 86. The pin is normally forced downwardly into inoperative position by a spring 185 extending around the pin and pressing against an internal shoulder 186 on the sleeve and a flange 188 near the lower end of the pin. The pin has a projection 190, extending through a cap 192 on the sleeve, and by which the pin is actuated. This is accomplished by a lever 194, pivoted at 196 on a bracket 198 on the table, the lever having at its inner end a stud 200 operatively engaging the lower end of the projection 190. The outer end of the lever has a roll 202 in engagement with a cam 204 on cam shaft 164. The cam is so timed that its high part 206 rocks the lever 194 to cause the pin 180 to raise the plunger 80 and the jaw 78 at the desired time to permit insertion or removal of a blank at the beginning of a cycle and to release the plunger 80 to close the jaw at the end of a cycle.

In the normal operation of the machine the speed control unit 134 is adjusted so that the conveyor is advanced intermittently by the Geneva mechanism 70 or 80 times per minute, each advance movement being through a distance corresponding to the length of one link between centers of adjacent pins 68.

Registering devices are provided to locate the chucks accurately in predetermined position relatively to the operating stations. Several of these devices are employed, and since they are similar, only one, that at the cut-off station 22, will be described.

As shown in Figs. 7 and 8, this device comprises a registration pin 210 slidably mounted in machined grooves 212 in a block 214 set in the table 10 and extending normal to the path of movement of the conveyor. The pin has a shank portion 216 and a hardened tip 218 secured to the shank portion by screws 220. The tip is tapered to form a V as shown at 222, and is adapted to enter into corresponding V-shaped notches 224 in hardened wear plates 226 in the link units 14. Each of the units has two of these plates located upon opposite sides of the link and held in position by screws 228, Fig. 5. This construction thus provides for engagement of each unit with registration pins 210 which can be located upon either side of the conveyor.

The outer portion of each pin 210 is supported by a bracket 229 bolted to the table. The pin is normally urged inwardly by a stiff spring 230 connecting an eye 232 on the bracket and a stud 234 at the outer end of the pin 210.

The pin 210 is arranged to be retracted by a cam 236, on cam shaft 164, and having a face 237 for retracting the pin by moving an abutment 238 secured by screws 240 to the outer end of the pin. The cam is so timed that prior to an advance movement of the conveyor the cam face contacts the abutment to effect movement of the pin 210 outwardly to release the link unit which it then engages and after the advance movement of the conveyor is completed the face 239 immediately passes off the abutment 238 releasing the pin 210 which is forced inwardly by the spring 230 with considerable force. The V-shaped portion 222 of the pin then engages the notch 224 in the newly advanced link unit to lock the unit in position with the chuck in alinement with the center line of the pin 210. During the movement of the pin the engagement of the tapered end of the pin with the walls of the notch effects a slight shifting of the link unit to center the latter if it is not in correct alinement at the end of the advance movement.

As above stated, several registering devices are employed particularly at stations where a variation in the position of a blank by a few thousandths of an inch may result in imperfect blanks. The devices are effective to take up the slight amount of play between the link units and to insure that the chucks 16 will be located in predetermined position relatively to the operating instrumentalities.

In the operation of the machine, the conveyor 12 is intermittently advanced, by the Geneva mechanism 152, through distances each corresponding to the length of a link unit 14 between its pivot pins 68, thus successively presenting the chucks 16 to the various operating instrumentalities located along the conveyor. Immediately after each advance movement of the conveyor the registration pins 210 under the action of the springs 230 are forced into notches 224 in the link units nearest the pins and shift the units slightly, if necessary, to center each unit with its chucks in alinement with the adjacent operating instrumentality. At the cut-off station 22, the lever 194, under the control of the cam 206, actuates the pin 180 to raise the movable jaw 78 of the chuck, then located at the station, to permit insertion of a severed blank, after which the jaw is lowered, prior to the next feed movement, to grip the blank. After each operation of the instrumentalities the registration pins are retracted by the cam 236 and another advance movement of the conveyor is initiated. The blanks 18 are thus advanced from the cut-off station successively to each of the operating instrumentalities which effect the several forming operations, and the completed hooks are finally discharged onto the belt 42.

Having thus described my invention, what I claim as new and desire to secure by Letters Patent of the United States is:

1. A fishhook making machine comprising a table, a single line endless conveyor mounted in a vertical plane for lineal movement along the table, the conveyor being made up of a plurality of similar link units, each having a prong end and a fork end, the prong and fork each being perforated for a shaft, a shaft member passing therethrough, a pair of rollers respectively positioned on opposite ends of said shaft to provide a four wheel carriage effect, a pair of horizontal ways to carry said rollers, each of said link units having notches on opposite sides for engagement with an indexing bar which in combination with said shafts, rollers, and ways provides a highly accurate positioning of said link units, a plurality of operating instrumentalities located on the table along the path of movement of the conveyor and spaced apart by distances corresponding to multiples of the length of a link unit, means comprising a Geneva Cross movement for intermittently advancing the conveyor through distances each equal to the length of a unit, each of the units having a blank supporting chuck, the said chuck having a vertical sleeve with an anvil at the top thereof, a center bar within said sleeve having a gripping jaw at the top thereof cooperating with said anvil, and spring pressing means at the bottom thereof operating between said sleeve and said center bar to press said gripping jaw against said anvil with such a pressure as to hold a wire blank thereon and means operable after an advance movement of the conveyor for locating a link unit with its chuck in predetermined position relatively to an operating instrumentality comprising an index rod adapted to cooperate with at least one of said notches in said link unit together with an operating lever adapted to compress said spring to release a finishd fishhook and to accept a fresh wire blank.

2. In a fishhook making machine, a linear table member comprising pairs of upper and lower carriers, the upper at least comprising horizontal ways and vertical guide members thereabove, traversing sprocket wheels positioned at opposite ends of said carrier members on horizontal shafts, shafts for said sprocket wheels, a carrier chain running over said sprockets in cooperation with said upper and lower carrier members, the ways in the upper carrier member serving to give very accurate positioning of the chain in a vertical plane, the guide members serving to give very accurate positioning of the chain in a horizontal plane, a chuck member forming a part of each link and comprising a vertical sleeve projecting upward from said link, a pressure bar within said sleeve projecting both upwardly and downwardly from said link and having a gripping member at the top cooperating with said sleeve and a spring cooperating between said link and said rod below said link to pull said rod downward and grip a fishhook blank, a lever member cooperating successively with the bottom ends of said bars to release and reclamp blanks, a plurality of operating stations positioned along said carriers, spaced apart a plurality of link lengths, each operating station being equipped with an index bar, each link having a notch to receive said index bar for positioning of the links in the third, lengthwise dimension, a Geneva Cross intermittent motion connected to one of said sprocket wheels for intermittent advancement of said chain, each movement being equal to the length of one link.

3. In a fishhook making machine, a linear table member comprising pairs of upper and lower carriers, the upper at least comprising horizontal ways and vertical guide members thereabove, traversing sprocket wheels positioned at opposite ends of said carrier members on horizontal shafts, shafts for said sprocket wheels, a carrier chain running over said sprockets in cooperation with said upper and lower carrier members, the ways in the upper carrier member serving to give very accurate positioning of the chain in a vertical plane, the guide members serving to give very accurate positioning of said chain in a horizontal plane, a chuck member forming a part of each link and comprising a vertical sleeve projecting both upwardly and downwardly from said link and having a gripping member at the top, cooperating with said sleeve, and a spring cooperating between said link and said rod below said link to pull said rod downward and grip a fishhook blank, a lever member cooperating successively with the bottom ends of said bars to release and reclamp blanks, a plurality of operating stations positioned along said carriers spaced apart a plurality of link lengths, each operating station being equipped with an index bar, each link having a notch to receive said index bar for accurate positioning of the links in the third, lengthwise dimension, a Geneva Cross intermittent motion connected to one of the said sprocket wheels for intermittent advancement of said chain, each movement being equal to the length of one link, the successive operating stations comprising successively a wire blank feeding and severing means, a pointing means, a barbing means, and a bending means in appropriate sequence.

References Cited in the file of this patent

UNITED STATES PATENTS

| Number | Name | Date |
| --- | --- | --- |
| 1,907,532 | Flaws | May 9, 1933 |
| 2,057,939 | Davis | Oct. 20, 1936 |
| 2,249,230 | Schafer | July 15, 1941 |
| 2,379,886 | De Witt et al. | July 10, 1945 |
| 2,392,169 | Mansfield | Jan. 1, 1946 |

FOREIGN PATENTS

| Number | Country | Date |
| --- | --- | --- |
| 3,442 | Great Britain | Feb. 11, 1904 |